Patented July 15, 1952

2,603,632

UNITED STATES PATENT OFFICE 2,603,632

METHOD OF PREPARATION OF PHOSPHORIC ACID ESTERS OF RIBOFLAVIN

Joseph F. Weidenheimer and Charles C. Reed, Pearl River, N. Y., assignors to American Cyanamid Company, New York, N. Y., a corporation of Maine No Drawing. Application April 6, 1949, Serial No. 85,947

7 Claims. (Cl. 260—211.3)

Our invention pertains particularly to the formation of phosphoric acid esters of riboflavin, more particularly the mono-phosphate and the di-phosphate esters. These esters are prepared by the direct action of ortho-phosphoric acid upon the free riboflavin.

In the past the mono-riboflavin ester of phosphoric acid has been prepared by the action of phosphorus oxychloride on riboflavin in pyridine solution; note for example the work of Kuhn and Rudy, Berichte 68 B, 383–6 (1935); and also U. S. Patent 2,111,491 to the same inventors. The process of our invention for the preparation is much quicker and simpler and more efficient as no solvent is required in the preparation and the yields are remarkably high and uniformly satisfactory.

The phosphoric acid esters are prepared by the reaction of the riboflavin with approximately 100% ortho-phosphoric acid at temperatures of from about 100° C. for 10 minutes to 60° C. for 2 hours. The ratio of phosphoric acid to riboflavin may be varied from one part by weight of phosphoric acid to one part by weight of riboflavin which will give the mono-phosphoric ester of riboflavin to more than three parts of orthophosphoric acid per part of riboflavin which gives a tri or higher ester of the riboflavin.

The riboflavin phosphate esters as prepared may be recovered from the mix by dissolving in ethyl alcohol and mixing with ether which will precipitate the riboflavin phosphate esters. The precipitated material may be collected on a filter, washed with ether, acetone, and air dried.

Because the tri-phosphate has a low therapeutic value, it is not normally desired that it be produced.

The mono- and the di-phosphoric esters have remarkably high therapeutic efficiency. The di-phosphate in fact with micro-biological tests has been found to show a riboflavin content of slightly higher than theoretical which may be partially due to the fact that riboflavin presumably appears in living structures as a phosphoric acid compound and the conversion to the phosphate esters may in fact render the material more available from the standpoint of the living organism than is the original riboflavin.

The phosphate esters are particularly advantageous therapeutically because they are markedly more soluble than is the riboflavin itself. The mono-phosphate is soluble to the extent of 5 milligrams per milliliter in hot water and to the extent of at least 2 milligrams per milliliter in distilled water at room temperature, forming a solution with a pH of approximately 2.6. The di-phosphate is similarly soluble but gives a pH of about 1.85.

In the presence of other vitamins the solubility of the riboflavin phosphates is increased considerably. Certain multi-vitamin preparations containing niacinamide, vitamin C, pyridoxin, folic acid, etc. are found to act as a solvent for the riboflavin phosphate esters to the extent of between 7.5 and 8 milligrams per milliliter at a pH of around 3.5. The exact solubility will vary with the multi-vitamin preparation which of course varies in accordance with the individual practitioner's choice of vitamin therapy. The material is sufficiently soluble so that a therapeutically effective dose is retained without difficulty in the volumes of solution which are currently desired. Mixtures of the mono- and di-phosphate may of course be used rather than the individual compounds.

The following specific examples are illustrative of certain embodiments of our invention. It is to be understood of course that the spirit of the teachings will, to those skilled in the art, suggest certain changes which may be made without departing from the guiding principles of the invention or the scope of the claims.

Example 1

100% ortho-phosphoric acid was prepared by mixing 85% syrupy $H_3PO_4$ with the theoretical quantity of phosphorus pentoxide to convert to 100% $H_3PO_4$. To 5 grams of riboflavin U. S. P. was added 5 grams of ortho-phosphoric acid and the mixture heated on a steam bath for 30 minutes. The clear dark red melt was cooled, dissolved in 5 volumes of ethanol, and after solution was poured into 5 volumes of ether, causing the ester to precipitate. The thus precipitated riboflavin mono-phosphate was collected by filtration, washed with cold ether, cold acetone, and dried in a vacuum oven. There was obtained a yield of 5 grams, or 83% of the theoretical.

Example 2

5 grams of riboflavin were treated as in Example 1 except that 10 grams of the phosphoric acid reagent and 10 volumes of ethanol were used. There was obtained a yield of 4.8 grams or 67% of the theoretical yield. The material appeared to be the same color and approximately the same crystalline structure as the original riboflavin.

Example 3

5 grams of riboflavin were mixed with 5 grams of 100% ortho-phosphoric acid and heated to 100° C. for 10 minutes. The hot melt was poured with stirring into 25 milliliters of ethanol and after cooling, was mixed with 5 times its volume of ether. The mixture was allowed to stand until the riboflavin mono-phosphate had precipitated out and the crystals collected, washed with ether, and dried. The thus formed crystals showed a melting point of 187 to 189° C.

Example 4

5 grams of riboflavin and 10 grams of ortho-phosphoric acid were heated at 80° C. for two hours. The material was poured into 100 milliliters of ethanol which after cooling was diluted with 5 volumes of ether and the precipitated riboflavin di-phosphate collected on a filter. After washing and drying the crystals, they were found to have a melting point of 178 to 180° C. (Melting point may vary with the rate of heating of the melting point apparatus.)

Example 5

5 grams of riboflavin and 5 grams of ortho-phosphoric acid were heated at 60° C. for three hours. The material was poured molten into 50 milliliters of methanol which was cooled and then mixed with 250 milliliters of methyl ether, and the precipitated riboflavin mono-phosphate collected on a filter. After washing and drying, the crystals were found to be identical with those of Example 3.

The compounds above were tested for riboflavin content. The mono-phosphate as prepared in Example 1 theoretically should contain 82.5% of riboflavin. When tested fluormetrically the compound indicated an 82.0% riboflavin content and when tested by the standard micro-biological procedure was found to analyze 76.6% of riboflavin. When the di-phosphate produced in accordance with Example 2 was tested, there was found on a theoretical content of 69.7%; a fluormetric riboflavin content of 70.0%; and by a micro-biological analysis, 72.0% riboflavin. For comparison a riboflavin tri-phosphate was prepared, by using more of the phosphoric acid reagent and having a theoretical riboflavin content of 61.0%; a fluormetric content of 61.0%; and a micro-biological analysis of 16.4% riboflavin. The analysis shows that the tri-phosphate is not as satisfactory as a source of riboflavin when tested by micro-biological procedures.

The phosphoric acid-riboflavin melt may be dissolved in any of the common alcohols, using larger quantities, as indicated by solubilities, in the higher alcohols, such as propanol, isopropanol, the butanols, etc. polyhydric alcohols etc.

The alcoholic solution may have the desired product precipitated therefrom by ethyl ether, methyl ether, butyl ether, or other ethers, the ketones, such as acetone, methyl ethyl ketone, isopropyl ketone, propyl ketone, mixed ketones, etc. The ethers are preferred because their solubilizing characteristics are such that they give higher yields.

Temperatures of appreciably above 100° C. cause the riboflavin to char and decompose. Temperatures of much below 60° C. require such a long time for reaction as to be not commercially as practical as the higher temperatures. Minor variations in the proportions, times and temperatures will give mixtures of the phosphate esters and for commercial purposes such mixtures are perfectly satisfactory.

Having thus disclosed certain modifications thereof, as our invention we claim:

1. A process for the preparation of phosphoric acid esters of riboflavin which comprises reacting together a mixture consisting essentially of riboflavin and approximately 100% ortho-phosphoric acid at a temperature of from about 60° C. to about 100° C., and recovery of the thus formed esters of riboflavin phosphate.

2. A process for the preparation of phosphoric acid esters of riboflavin which comprises reacting together riboflavin and approximately 100% ortho-phosphoric acid at a temperature of from about 60° C. to about 100° C. for a period of from about two hours to about 10 minutes and recovery of the thus formed riboflavin phosphate esters.

3. A process for the preparation of phosphoric acid esters of riboflavin which comprises reacting together a mixture consisting essentially of riboflavin and approximately 100% ortho-phosphoric acid in approximately equal weight proportions at a temperature of from about 60° C. to about 100° C. and recovering the thus formed riboflavin mono-phosphate ester.

4. A process for the preparation of phosphoric acid esters of riboflavin which comprises reacting together a mixture consisting essentially of riboflavin and approximately 100% ortho-phosphoric acid in the approximate proportions of one part riboflavin to two parts of ortho-phosphoric acid at a temperature of from about 60° C. to about 100° C. and recovering of the thus formed di-phosphoric acid esters of riboflavin.

5. A process for the preparation of phosphoric acid esters of riboflavin which comprises reacting together a mixture consisting essentially of riboflavin and approximately 100% ortho-phosphoric acid at a temperature of from about 60° C. to about 100° C., eluting the reaction mixture with an alcohol, precipitating the phosphoric acid esters of riboflavin therefrom by admixture with a solvent selected from the group consisting of ethers and ketones, and recovering the thus precipitated product.

6. A process for the preparation of phosphoric acid esters of riboflavin which comprises heating together a mixture consisting essentially of riboflavin and approximately 100% ortho-phosphoric acid at a temperature from about 60° C. to about 100° C. for a period of about two hours to about 10 minutes, dissolving the reaction mixture in an alcohol, precipitating the phosphoric acid esters of riboflavin therefrom by admixture with a solvent selected from the group consisting of ethers and ketones, and recovering the thus precipitated esters of phosphoric acid and riboflavin.

7. A process for the preparation of phosphoric acid esters of riboflavin which comprises heating together a mixture consisting essentially of riboflavin and approximately 100% ortho-phosphoric acid at a temperature from about 60° C. to about 100° C. for a period of about two hours to about 10 minutes, dissolving the reaction mixture in ethyl alcohol, precipitating the phosphoric acid esters of riboflavin therefrom by admixture with ethyl ether, and recovering the thus precipitated esters of phosphoric acid and riboflavin.

JOSEPH F. WEIDENHEIMER.
CHARLES C. REED.

REFERENCES CITED

The following references are of record in the file of this patent:

UNITED STATES PATENTS

| Number | Name | Date |
|---|---|---|
| 2,052,029 | Harris | Aug. 25, 1936 |
| 2,111,491 | Kuhn et al. | Mar. 15, 1938 |
| 2,256,380 | Dickey | Sept. 16, 1941 |
| 2,535,385 | Breivogel | Dec. 26, 1950 |

OTHER REFERENCES

Carre, Compt. Ren. 139 (1904), pages 637–639, 3 pages.

Rosenberg, "Vitamins," 1942, page 156, 1 page.